United States Patent [19]

Meinherz et al.

[11] Patent Number: 5,025,118
[45] Date of Patent: Jun. 18, 1991

[54] METAL-CLAD, COMPRESSED GAS-BLAST CIRCUIT-BREAKER WITH A SHIFTING LINKAGE

[75] Inventors: Manfred Meinherz; Freidrich-Wilh Veuhoff; Günther Gilmozzi; Thomas Kelch, all of Berlin, Fed. Rep. of Germany

[73] Assignee: Siemens Aktiengesellschaft, Berlin & Munich, Fed. Rep. of Germany

[21] Appl. No.: 467,979

[22] Filed: Jan. 22, 1990

[30] Foreign Application Priority Data

Feb. 7, 1989 [DE] Fed. Rep. of Germany ....... 3904146

[51] Int. Cl.[5] ............................................ H01H 33/42
[52] U.S. Cl. .......................... 200/148 R; 200/148 F; 200/148 B
[58] Field of Search ........... 200/148 R, 148 F, 148 A, 200/148 B

[56] References Cited

FOREIGN PATENT DOCUMENTS 0075668 7/1982 European Pat. Off. .
2847221 10/1979 Fed. Rep. of Germany .
2943386 4/1980 Fed. Rep. of Germany .
7601366 2/1981 Fed. Rep. of Germany .
2089571 6/1982 United Kingdom .

Primary Examiner—Robert S. Macon
Attorney, Agent, or Firm—Kenyon & Kenyon

[57] ABSTRACT

A metal-clad, compressed gas-blast circuit-breaker (1) with a gas-filled housing (2) and with an interrupter unit (3), which is supported, insulated in the housing (2), has at least one insulating drive rod (26) coupled to the switching contact (20) to actuate a movable switching contact (20). This drive rod (26), which is connected to the interrupter unit (3), extends through a controlling element (5), which takes up and guides the flow of the switching gases at the time of the switching-off operation, as well as through a hollow post insulator (4) connected to the controlling element (5). The controlling element (5) allows only a portion of the switching gases to pass through in the direction of at least one drive rod (26) and diverts the remaining portion in an at least radial direction. In this manner, the pressurization of the drive rod (26) and the post insulator (4) by the switching gases is reduced. The circuit-breaker is especially suited for application in gas-insulated, metal-clad, high-voltage switching stations.

13 Claims, 5 Drawing Sheets

METAL-CLAD, COMPRESSED GAS-BLAST CIRCUIT-BREAKER WITH A SHIFTING LINKAGE

BACKGROUND OF THE INVENTION

The present invention relates to a metal-clad, compressed gas-blast circuit-breaker having a gas-filled housing and an interrupter unit, which is supported on insulated mountings in the housing and having contact conduits disposed so that they mutually oppose each other with clearance and a movable switching contact to jumper the contact conduits, and a shifting linkage, which is connected to the switching contact and transmits a switching motion.

In the case of a known circuit-breaker of this type, the shifting linkage consists of a combination of insulating and metallic drive rods, whereby a drive rod made of metal is coupled to the interrupter unit. These types of drive rods are insensitive to hot switching gases emerging from the interrupter unit during switching operations. An additional drive rod, which is connected to a driving element and to the metallic drive rod, provides for insulation against the grounded housing.

SUMMARY OF THE INVENTION

An object of the present invention is to reduce the overall axial length of a circuit-breaker of the indicated type, while still providing the same dielectric safety.

The above and other objects of the present invention are achieved by a metal-clad, compressed gas-blast circuit-breaker having a gas-filled housing and an interrupter unit, the interrupter unit being supported, insulated in the housing and having contact conduits disposed so that they mutually oppose each other with clearance and a movable switching contact to jumper the contact conduits, and a shifting linkage, which is connected to the switching contact and transmits a switching motion, the shifting linkage comprising at least one insulating drive rod coupled to the switching contact and further comprising a controlling element, which takes up and guides the flow of the switching gases at the time of the switching-off operation mounted between the interrupter unit and a post insulator penetrated by at least one drive rod, and allowing only one portion of the switching gases to pass through in the direction of at least one drive rod and diverting the remaining portion in an at least radial direction.

In this configuration, no metallic part is required in the switching rod, because the insulating drive rod can sense the transmission of switching motion between the interrupter unit and a driving element, which provides the switching motion, and can also sense the insulation between these parts. The drive rod is relieved of the damaging effects caused by the switching gases, in that the controlling element immediately diverts a considerable portion of the switching gases sideways, when they emerge from the breaker unit. If the gas is diverted more vigorously than the radial direction, then its circulation in the circuit-breaker housing will be increased, thus avoiding any blockage caused by the gas flow striking the circuit-breaker housing directly.

The branching-off of the portion of the switching gas flow intended for diversion can be achieved in that the controlling element features an intake port for the switching gases and an exhaust port, which is in alignment with this intake port, but has a smaller cross-section than it. The diversion can take place thereby with low losses, in that a wall section of the controlling element provided with the exhaust port has a convex depression encircling the exhaust port in a ring-shape to divert the switching gases in an at least radial direction.

The minimum of one available drive rod can be protected, already in the area of the controlling element, from a direct pressurization by switching gases, due to the fact that a wall section of the controlling element provided with the intake port and the wall section provided with the exhaust port are connected by shielding ribs, in accordance with the number of drive rods, in an arrangement which allows the drive rods to be shielded from the flow of the switching gases.

At the same time, the controlling element can assume the task of an electric connection device for the interrupter unit, in that the mentioned wall sections are joined in a bridge-like connection by a segment designed as an electric connector.

The controlling element can also serve as a mounting means for the interrupter unit. For this purpose, on its side turned toward the post insulator, the wall section of the controlling element provided with the exhaust port can have a central depression adapted to the end area of the post insulator. For the dielectric unloading of the post insulator next to this connection area, the controlling element can be designed to surround the adjacent end area of the post insulator with a rounded torus.

Another similar controlling element can be mounted on the side of the interrupter unit turned away from the post insulator, whereby the exhaust port of the additional controlling element is arranged at the entrance of an additional buffer chamber disposed inside the housing. Such a buffer chamber can be formed, for example, by a hollow supply lead of the interrupter unit. A portion of the switching gases is temporarily stored in this buffer chamber as a result of compression and, therefore, does not directly attain the housing of the circuit-breaker. This lessens the dielectric and mechanical loading of the insulating parts of the circuit-breaker during the switching operations.

As already mentioned, the controlling element is also suited and provided as a mounting means for the interrupter unit. In this connection, to connect the post insulator consisting only of insulating material with the controlling element next to the post insulator, while leaving an opening dimensioned for the passage of at least one drive rod and of switching gases, a cut-in edge area and a clamping plate are provided. When this clamping plate is placed on the edge area of the post insulator, it has wall sections extending into the opening of the post insulator which delimit a specific area for the passage of the minimum of one drive rod and a specific area for the discharge of switching gases out of the central opening defined by the interrupter unit. With this clamping plate design, the drive rod or drive rods are likewise shielded from the flow of the switching gases.

The post insulator, on its end area opposite the controlling element, that is the end area turned away from the interrupter unit, can bear on the outside a premolded flanged ring, which is mounted set back axially from the edge. This flanged ring is adapted to a bearing ring, which is mounted on the housing and used as an outer support. By this means, one achieves that the post insulator extends with its edge into the bearing ring and the switching gases are thus guided past the mounting parts. This measure also has an advantageous effect on the dielectric strength of the insulating arrangement.

While in principle the described configuration is feasible with a single insulating drive rod, it is recommended however to provide two drive rods arranged in parallel, which are flexibly connected, e.g., with articulation to the switching contact and to a blast, e.g., compression cylinder used to generate a gas flow, as well as on their opposite ends, to a fork lever, which can be actuated for closing and breaking operations via a shaft, which is sealingly introduced into the housing of the circuit-breaker.

The post insulator can preferably be manufactured without molded metal parts, in other words only of insulating material, and can have a hollow truncated-cone shape whose orifice size, in the area where it is fastened to the bearing ring on the side of the housing, is enlarged compared to the end area secured to the controlling element. This enlargement corresponds to the angular travel of the drive bars during closing and breaking operations. By appropriately selecting the cone angle, one can guarantee a sufficient clearance from the post insulator, as a function of the crank movement of the drive rods. As a result of its funnel shape, the post insulator also acts as a diffuser to disperse the flow of switching gas.

BRIEF DESCRIPTION OF THE DRAWINGS

The invention will be described in greater detail in the following detailed description with reference to the drawings, in which.

DETAILED DESCRIPTION

Figure 1:
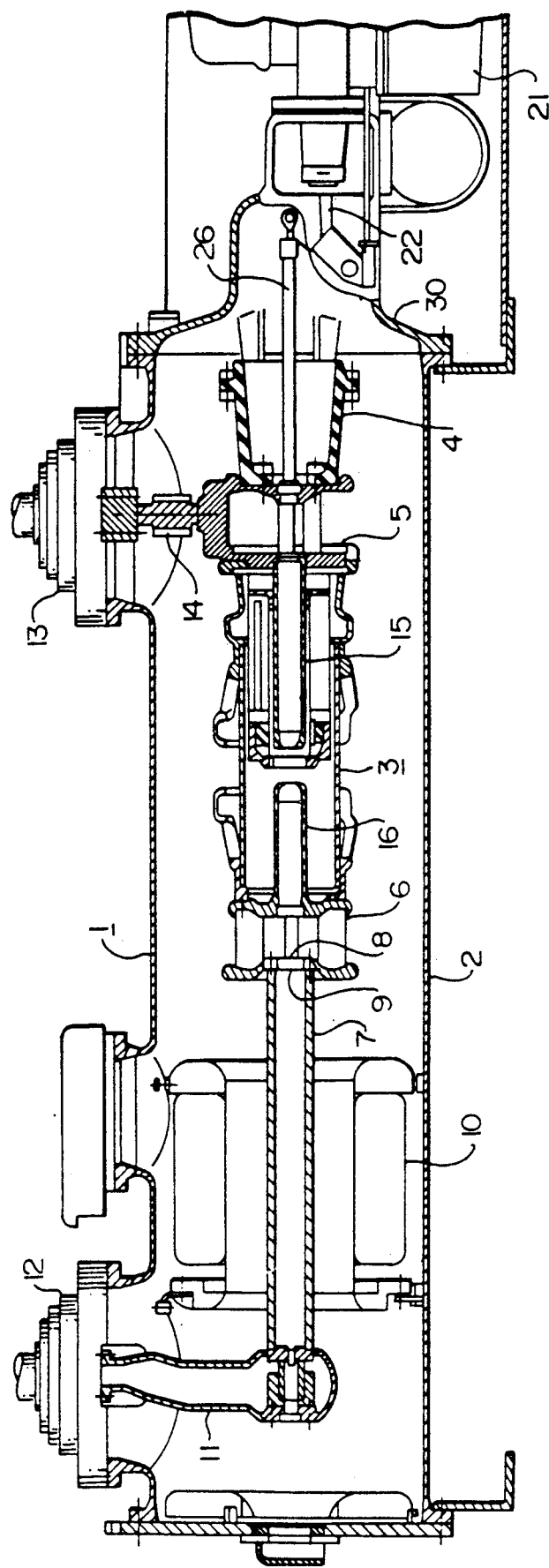
FIG. 1 shows a metal-clad, compressed gas-blast circuit-breaker for a high-voltage switching station in a greatly reduced schematic representation, in longitudinal section, to clarify the fundamental components of the circuit-breaker.

The metal-clad, compressed gas-blast circuit-breaker 1 depicted in FIG. 1 is especially provided for application in metal-clad and compressed-gas insulated, high-voltage switching stations. An interrupter unit designated generally with 3 is mounted in a housing 2 consisting of sheet metal, for example. The longitudinal axis of the interrupter unit coincides approximately with the longitudinal axis of the housing 2. To attach the interrupter unit 3, on its driving end, a hollow, somewhat truncated-cone shaped post insulator 4 is provided which is connected to a controlling element 5 and, on the opposite end, a further controlling element 6 is provided which is connected to a tubular conductor 7. This tubular conductor 7 serves at the same time as a primary winding for a current transformer 10. On its part, the tubular conductor 7 is supported by a retention arm 11 which is used at the same time to conduct current and by a bushing 12 opposite the housing 2. A further bushing 13 is connected via a coupling contact arrangement 14 to the controlling element 5, whose design and functions will be clarified later.

The interrupter unit 3 is of the puffer circuit-breaker (single-pressure circuit-breaker) type and has two contact conduits 15 and 16, which mutually oppose each other and are axially in alignment, as well as a stationary puffer or blast piston 17 and a movable puffer cylinder 18. In the depicted switched-off or open position, the puffer (blast piston) 17, the puffer cylinder 18 and a switching contact 20, which can slide between the puffer (blast piston) 17 and the contact conduit 15, are situated in the area of the contact conduit 15. For the switching-on operation, the switching contact 20 and the puffer cylinder 18 are shifted to the left over the contact conduit 16 in a generally known way, so that the contact conduits 15 and 16 are jumpered by the switching contact 20. The actuating movements for switching on and off are released by an actuator unit 21, which is arranged outside of the housing 2 more or less in its axial projection and which operates a shaft 24 by means of a connecting rod 22 and a crank 23. In a generally known way, this shaft 24 passes in a gas-tight manner through the inner wall of the housing 2 and bears a fork lever 25 there. Flexibly connected, e.g. with articulation, to the ends of the fork lever 25 are two drive rods 26. These drive rods are mounted parallel to each other and extend through the post insulator 4 and the controlling element 5 and, in a way which will be described later on, are connected to the puffer cylinder 18 and the switching contact 20.

Figure 2:
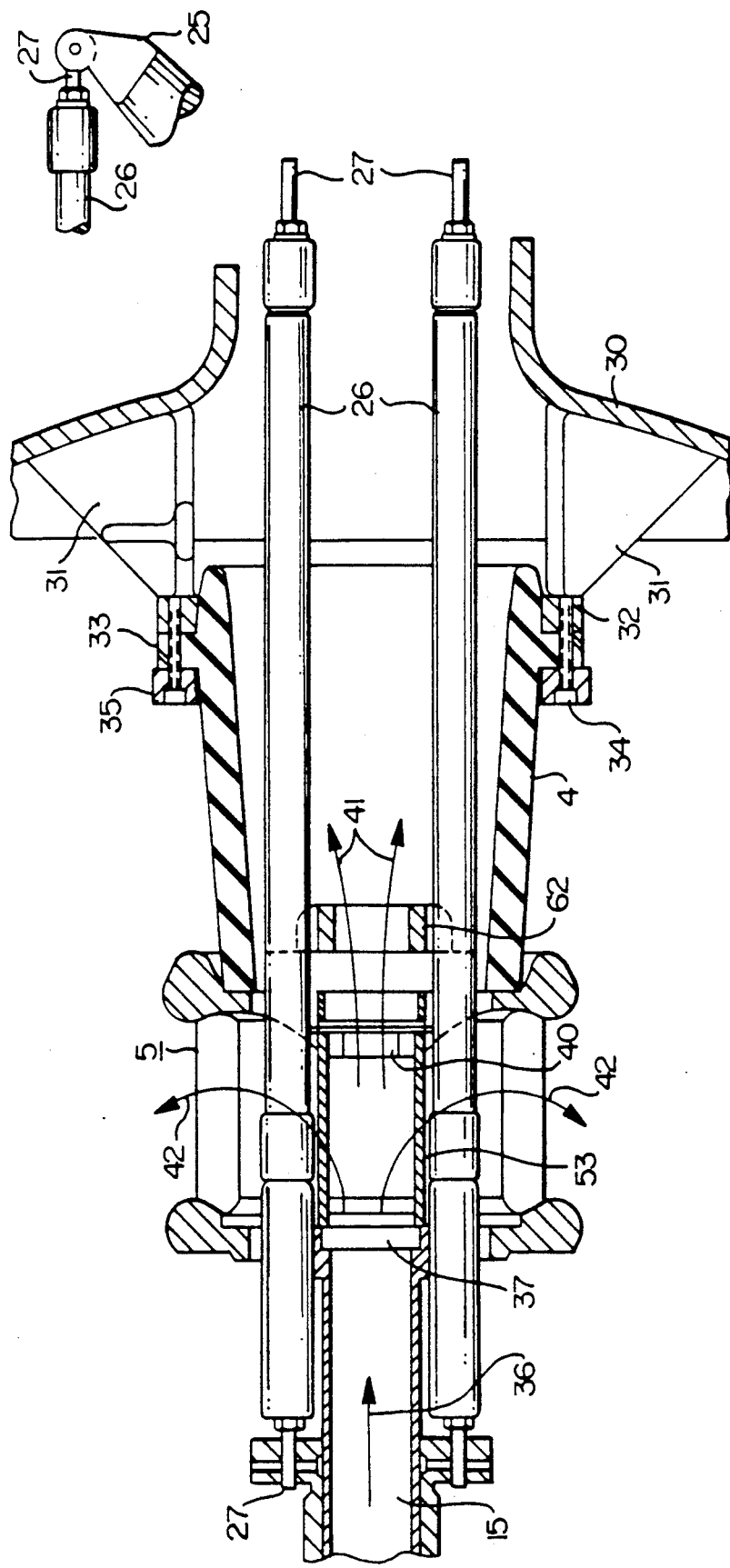
FIG. 2 depicts, in an enlarged representation compared to FIG. I, in sectional view, that area of the circuit-breaker, in which the branching off of the switching gases into an axial and a radial gas flow takes place.
Figure 3:
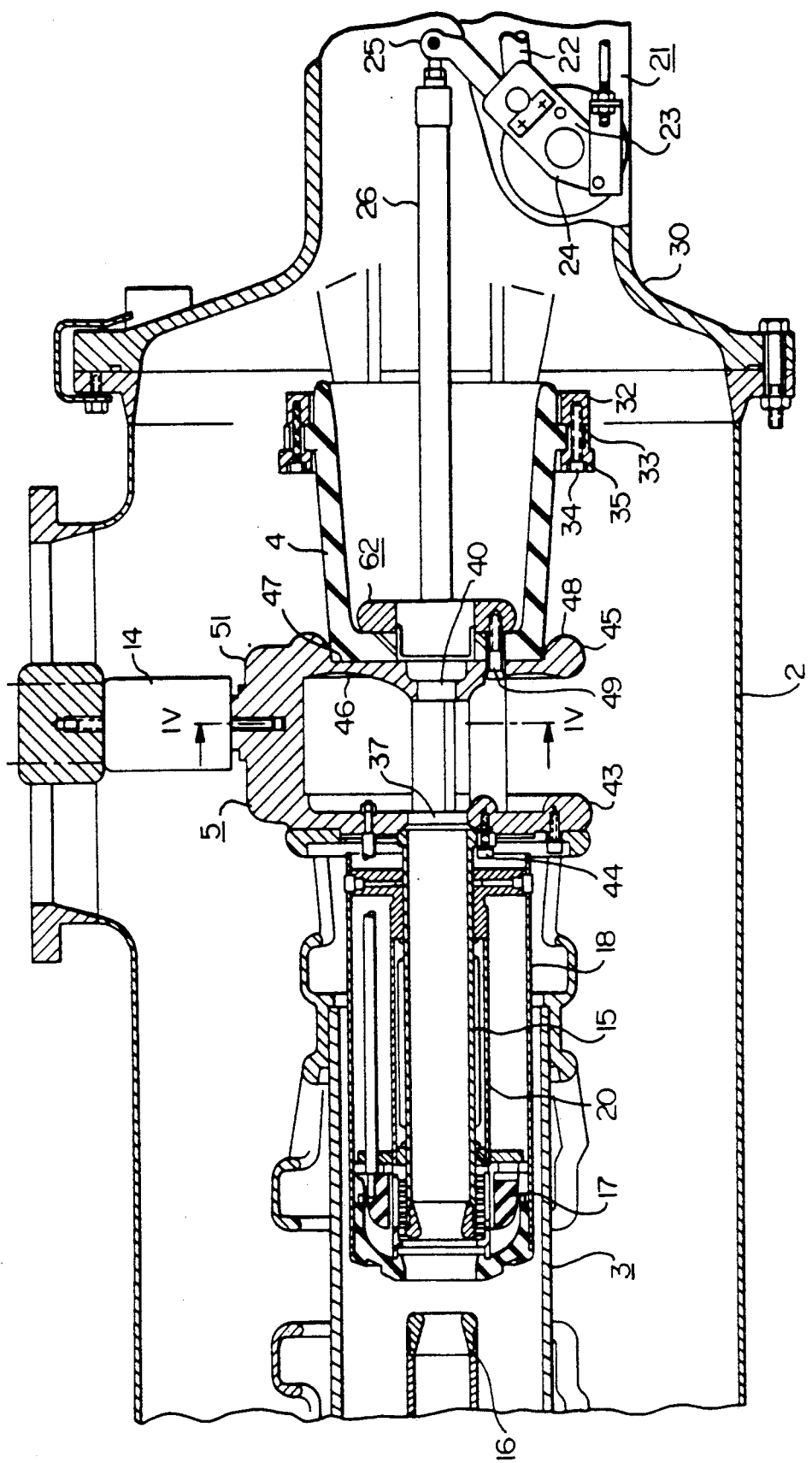
FIG. 3 depicts, in a longitudinal section rotated by 90° compared to FIG. 2, the controlling element, the post insulator and adjacent areas of the circuit-breaker.

In FIG. 2, a cut-away portion of the circuit-breaker 1 according to FIGS. 1 and 3 is shown in the area of the post insulator 4 and the drive rods 26. This representation is rotated by 90° compared to the aforementioned figures, so that both parallel-mounted drive rods 26 are visible. Furthermore, one can recognize that the drive rods 26 are provided on both ends with eye pieces 27 to provide for an articulated connection with the switching contact 20 or with the fork lever 25. A bearing ring 32, which is internally supported via ribs 31 on a head piece 30 of the housing 2, serves as an outer support for the post insulator 4. In the casting process, the bearing ring 32 and the ribs 31 can be manufactured in one piece with the head piece 30. The post insulator 4 rests with a premolded flanged ring 33 on the bearing ring 32. This premolded flanged ring 33 is shown separately again in FIG. 5. Screws 34 brace the post insulator 4 opposite the bearing ring 32 by way of a clamping ring 35 placed on the flanged ring 33.

Figure 4:
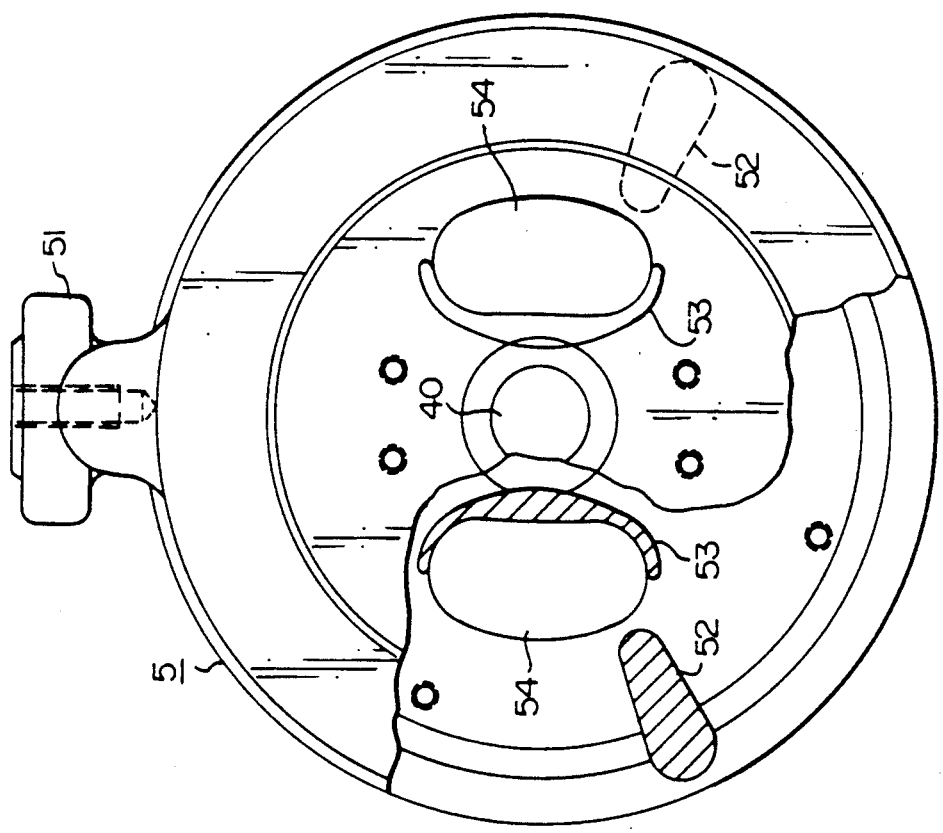
FIG. 4 shows the controlling element depicted partially opened up in an axial section along IV—IV of FIG. 3, to show the shielding ribs provided for the protection of the drive rods.

While the design of the controlling element 5 will be explained separately based on FIGS. 3 and 4, FIG. 2 is especially useful to illustrate the mode of operation of the controlling element when the circuit-breaker 1 is switched off. For this purpose, the flow of the switching gases inside the contact conduit 15 is indicated with an arrow 36. Since an intake port 37 of the controlling element 5 corresponding to the cross-section of the contact conduit 15 is opposed on the controlling element's opposite side only by a smaller exhaust port 40, only one portion of the switching gases designated with the arrows 41 retains the original direction of flow and thus, continuing more or less in the direction of the drive rod 26, attains the housing 2 through the post insulator 4. Another portion of the switching gases which is designated with the arrows 42 exits the controlling element 5 at its periphery. As indicated by the shape of the arrows 42, the switching gases are diverted in a direction which is more than radial, to avoid striking the wall of the housing 2 directly and, instead, to achieve a thorough mixing of cooled and heated gases through the circulation of these gases in the housing 2. Particulars concerning the controlling element 5 shall now be explained in greater detail based on FIG. 3.

The controlling element 5 has a wall section 43, in which is situated the intake port 37. This wall section is connected by screws 44 to the interrupter unit 3. An additional wall section 45, in which is found the exhaust port 40, is positioned parallel to the wall section 43. The wall section 45 is provided on the inside with a ring-shaped depression 46 which is convex to such an extent that the switching gases are diverted in more than the radial direction as indicated in FIG. 2 by the arrows 42. On its periphery, the wall section 45 is provided with a central depression 47, in which the post insulator 4 engages with its end area 50.

The wall sections 43 and 45 are connected, bridge-like, only over a small part of their periphery. At the same time, this segment forms an electrical connection for the interrupter unit 3 by way of the coupling contact arrangement 14 mentioned already in the description of FIG. 1.

In addition to the segment 51, both wall sections 43 and 45 of the controlling element 5 are reinforced by supporting ribs 52 and shielding ribs 53. In this case, the shielding ribs 53 limit the oval openings 54 provided on both sides of the intake port 37 and the exhaust port 40 for the passage of the drive rods 26. In this manner, the drive rods are prevented from being directly pressurized by the hot switching gases. Thus, the controlling element 5 is open at the largest part of its periphery.

Figure 5:
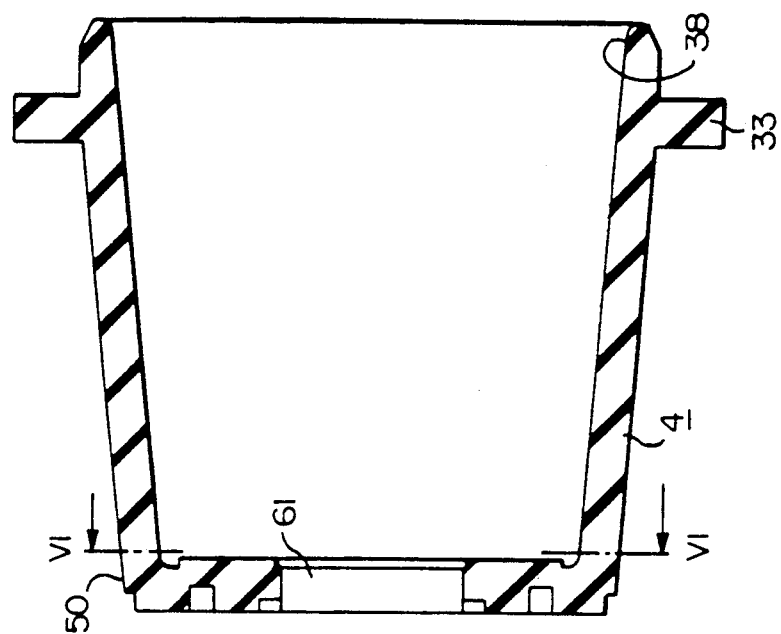
FIG. 5 shows a post insulator in an axial section.
Figure 6:
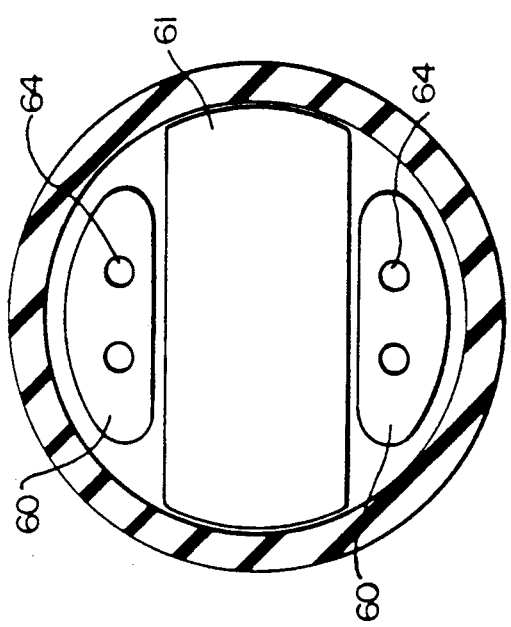
FIG. 6 depicts an end area of the post insulator according to FIG. 5 turned toward the controlling element along a section VI—VI in FIG. 5.

The post insulator 4 depicted separately in FIGS. 5 and 6 has more or less the shape of a hollow truncated cone and, in its end area 50, has two mutually opposing cut-in areas 60 provided for the passage of fastening screws. An opening 61 for the switching gases and the drive rods 26 remains between the edge areas. Furthermore, the post insulator 4 has at its end facing opposite the end area 50 the already mentioned flanged ring 33, which is arranged set back axially with respect to the end of the post insulator. As FIG. 3 shows in particular, with this design, the post insulator projects through the bearing ring 32 on the side of the housing, so that the mounting configuration consisting of the bearing ring 32, the flanged ring 33, the clamping ring 35 and the fastening screws 34 is situated completely outside of the gas flow (arrows 41 in FIG. 2) running through the post insulator 4. For the further dielectric unloading of the post insulator 4, the central depression 47 of the wall section 45 of the controlling element 5 is encircled by a rounded torus 48 (FIG. 3), which is premolded on the wall section 45.

Figure 7:
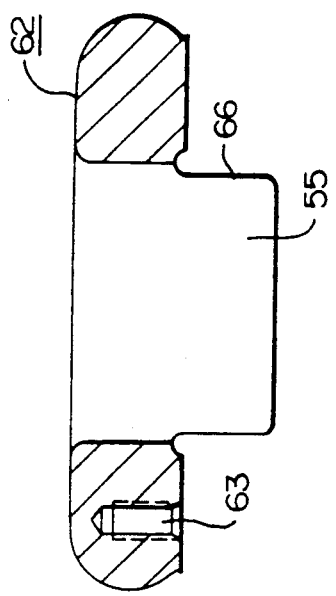
FIGS. 7, 8 and 9 show, in views or sections rotated by 90°, a clamping plate which connects the post insulator to the controlling element.
Figure 9:
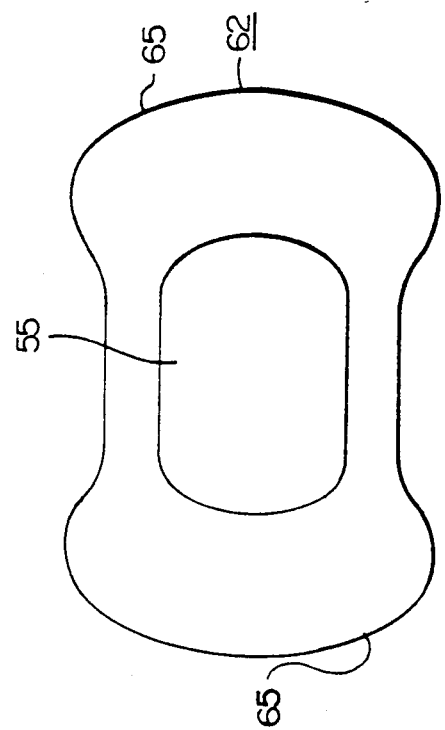
Figure 8:
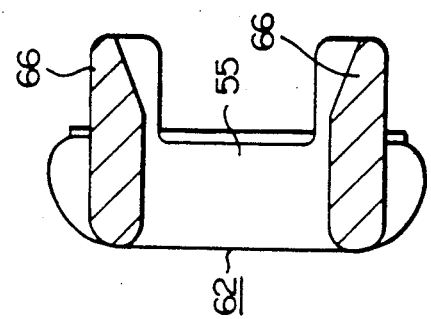

A clamping plate 62 shown in two sections and in a view in FIGS. 7, 8 and 9 is used to secure the post insulator 4 to the wall section 45 of the controlling element 5. The clamping plate 62, with its elongated, rounded off and laterally drawn-in shape (FIG. 9), has mutually opposing shanks 65 intended for seating on the edge areas 60 of the post insulator 4. In these shanks 65 are found blind holes 63 for screws 49, which extend through the wall section 45 of the controlling element 5 (FIG. 3) and through the through-holes 64 in the edge areas 60 of the post insulator 4 (FIG. 6). Wall sections 66 (FIGS. 7 and 8), whose form is particularly clear from FIG. 7, extend between the shanks 65. The clamping plate 62 extends with these wall sections into the opening 61 in the end area 50 of the post insulator 4 (FIG. 6), to delimit a section of the entire cross-section of the opening 61 provided for the passage of the switching gases from lateral areas used for the passage of the drive rods 26 (FIGS. 2 and 3). At this location, as well, the drive rods are thus shielded from the flow of the hot switching gases.

As already mentioned, a further controlling element 6 is situated on the outgoing end of the interrupter unit 3. This controlling element 6 distributes the flow of switching gases emerging from the contact conduit 16 into an axial and a radial portion. The somewhat parallel arrangement of two wall sections and supporting ribs situated between them corresponds essentially to the design of the controlling element 5 described on the basis of FIGS. 3 and 4. Accordingly, situated opposite an intake port of the controlling element 6 is a smaller exhaust port 8 (FIG. 1) in a wall section, which is provided with a ring-shaped depression to divert a portion of the switching gases in a radial, or more pronounced than radial direction. This exhaust port 8 is situated at the entrance of a buffer chamber 9, which is formed by the interior space of the tubular conductor 7. This interior space can either be closed or provided on its end with relief ports. During a switching operation, as a result of the compression of a portion of the switching gases, the buffer chamber 9 acts as a temporary storage. After the completion of the switching operation, the switching gases flow away again and take part in the general intermixing of heated and cool gases in the housing 2. In this manner, the amount of stress that all parts are subjected to is reduced during the switching operation.

As one can infer from the above description, particularly in connection with FIGS. 1 and 3, the described circuit-breaker is distinguished by a comparatively short type of construction, which is achieved by eliminating the metallic drive rods previously used between the actuator unit and the interrupter unit. In this manner, the interrupter unit 3 can be retained in the housing 2 at the drive end by a relatively short post insulator 4. Thereby, the damaging effects that the post insulator and the insulating drive rods are subjected to as a result of the switching gases is reduced by the controlling element 5 mounted between the post insulator 4 and the interrupter unit 3, so that one can select a post insulator with a relatively simple design and a short overall axial length.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A metal-clad, compressed gas-blast circuit-breaker having a gas-filled housing and an interrupter unit, the interrupter unit being supported, insulated in the housing and having contact conduits disposed so that they mutually oppose each other with a clearance and further comprising a movable switching contact for jumpering the contact conduits, and a shifting linkage connected to the switching contact for transmitting a switching motion, wherein the shifting linkage comprises at least one insulating drive rod coupled to the switching contact and a controlling element, for taking up and guiding the flow of switching gases at the time of the switching-off operation, the controlling element being mounted between the interrupter unit and a post insulator penetrated by at least one drive rod, and allowing only one portion of the switching gases to pass through in the direction of at least one drive rod and diverting the remaining portion in an at least radial direction.

2. The circuit-breaker recited in claim 1, wherein the controlling element has an intake port for the switching gases and an exhaust port, which is in alignment with said intake port, but having a smaller cross-section than the intake port.

3. The circuit-breaker recited in claim 2, wherein a wall section of the controlling element provided with the exhaust port has a convex depression encircling said exhaust port in a ring-shape to divert the switching gases in an at least radial direction.

4. The circuit-breaker recited in claim, 1, wherein a wall section of the controlling element provided with the intake port and that wall section provided with the exhaust port are connected by shielding ribs, in accordance with the number of drive rods, in an arrangement which allows the drive rods to be shielded from the flow of the switching gases.

5. The circuit-breaker recited in claim 4, wherein the wall sections of the controlling element are joined in a bridge-like connection by a segment designed as an electric connector.

6. The circuit-breaker recited in claim 2, wherein on its side turned toward the post insulator, the wall section of the controlling element provided with the exhaust port has a central depression adapted to the end area of the post insulator.

7. The circuit-breaker recited in claim 1, wherein the controlling element surrounds the adjacent end area of the post insulator with a rounded torus.

8. The circuit-breaker recited in claim 1, wherein an additional controlling element is mounted on the side of the interrupter unit turned away from the post insulator, and the exhaust port of the additional controlling element is mounted at the entrance of an additional buffer chamber disposed inside the housing.

9. The circuit-breaker recited in claim 6, wherein to connect the post insulator comprising only insulating material with the controlling element next to the post insulator, while leaving an opening dimensioned for the passage of at least one drive rod and of switching gases, a cut-in edge area and a clamping plate are provided, and when seated on the edge area of the post insulator, said clamping plate has wall sections extending into the opening of the post insulator which delimit an area intended for the passage of the minimum of one drive rod and an area for the discharge of switching gases out of the central opening specific to the interrupter unit.

10. The circuit-breaker recited in claim 1, wherein the post insulator, on its end area opposite the interrupter unit, bears on the outside a premolded flanged ring, which is mounted set back axially from the edge, and said flanged ring is adapted to a bearing ring, which is mounted on the housing and used as an outer support.

11. The circuit-breaker recited in claim 10, wherein two drive rods arranged in parallel, which are flexibly connected to the switching contact and to a blast cylinder used to generate a gas flow, and further, on their opposite ends, to a fork lever, which can be actuated for closing and breaking operations via a shaft, which is sealingly introduced into the housing of the circuit-breaker.

12. The circuit-breaker recited in claim 11, wherein the post insulator comprises only insulating material.

13. The circuit-breaker recited in claim 11, wherein the post insulator has a hollow truncated-cone shape whose orifice size, in the area where it is fastened to the bearing ring on the side of the housing, is enlarged compared to the end area secured to the controlling element to an extent which corresponds to the angular travel of the drive bars during closing and breaking operations.

* * * * *